United States Patent
Martin et al.

(10) Patent No.: US 8,632,907 B2
(45) Date of Patent: Jan. 21, 2014

(54) METHOD AND DESIGN FOR EXTERNALLY APPLIED LASER WELDING OF INTERNAL CONNECTIONS IN A HIGH POWER ELECTROCHEMICAL CELL

(75) Inventors: Charles E. Martin, Georgetown, MA (US); Lucien Fontaine, Lincoln, RI (US); William H. Gardner, East Freetown, MA (US)

(73) Assignee: A123 Systems LLC, Livonia, MI (US)

( * ) Notice: Subject to any disclaimer, the term of this patent is extended or adjusted under 35 U.S.C. 154(b) by 712 days.

(21) Appl. No.: 12/623,967

(22) Filed: Nov. 23, 2009

(65) Prior Publication Data

US 2010/0266893 A1    Oct. 21, 2010

Related U.S. Application Data

(60) Provisional application No. 61/117,760, filed on Nov. 25, 2008.

(51) Int. Cl.
*H01M 2/00* (2006.01)

(52) U.S. Cl.
USPC .......................................... 429/163; 429/164

(58) Field of Classification Search
USPC ....................................................... 429/163
See application file for complete search history.

(56) References Cited

U.S. PATENT DOCUMENTS

| | | | |
|---|---|---|---|
| 5,834,133 A | 11/1998 | Narukawa et al. | |
| 5,985,478 A | 11/1999 | Kim | |
| 6,045,944 A | 4/2000 | Okada et al. | |
| 6,204,635 B1 | 3/2001 | Sullivan | |
| 6,399,242 B2* | 6/2002 | Kitoh et al. | 429/164 |
| 6,753,104 B2* | 6/2004 | Kitoh | 429/7 |
| 2003/0077505 A1* | 4/2003 | Goda et al. | 429/56 |
| 2004/0265683 A1* | 12/2004 | Merrill et al. | 429/56 |
| 2005/0147879 A1* | 7/2005 | Sargeant et al. | 429/174 |
| 2006/0024571 A1 | 2/2006 | Kim et al. | |
| 2007/0117011 A1* | 5/2007 | Myerberg et al. | 429/164 |
| 2007/0172728 A1* | 7/2007 | Yamashita et al. | 429/174 |
| 2008/0038632 A1 | 2/2008 | Hamada et al. | |
| 2008/0220316 A1* | 9/2008 | Berkowitz et al. | 429/56 |
| 2008/0257870 A1* | 10/2008 | Longfield et al. | 219/121.64 |

OTHER PUBLICATIONS

International Search Report issued for PCT/US2009/065567, dated Jan. 19, 2010 (8 pages).

* cited by examiner

*Primary Examiner* — Ula C Ruddock
*Assistant Examiner* — Jacob Marks
(74) *Attorney, Agent, or Firm* — Wilmer Cutler Pickering Hale and Dorr LLP

(57) ABSTRACT

An electrochemical cell includes components that are welded from an external source after the components are assembled in a cell canister. The cell canister houses electrode tabs and a core insert. An end cap insert is disposed opposite the core insert. An external weld source, such as a laser beam, is applied to the end cap insert, such that the end cap insert, the electrode tabs, and the core insert are electrically coupled by a weld which extends from the end cap insert to the core insert.

20 Claims, 6 Drawing Sheets

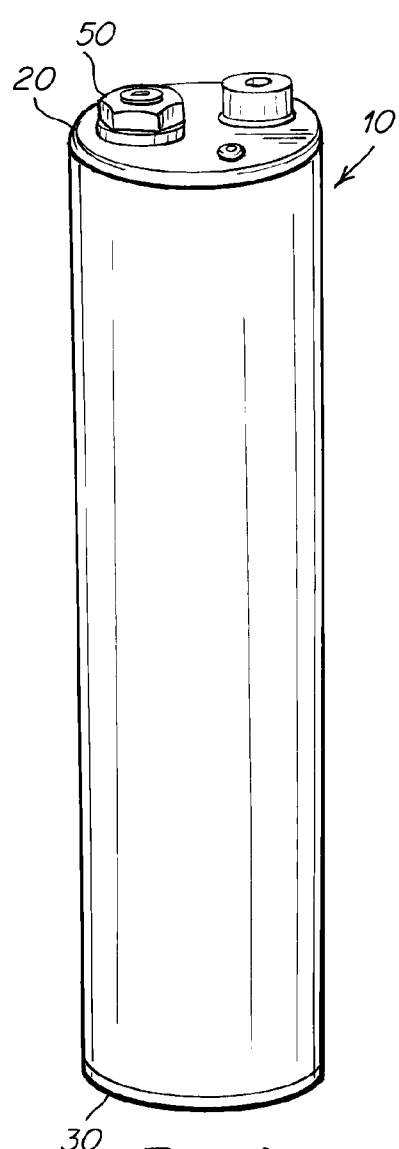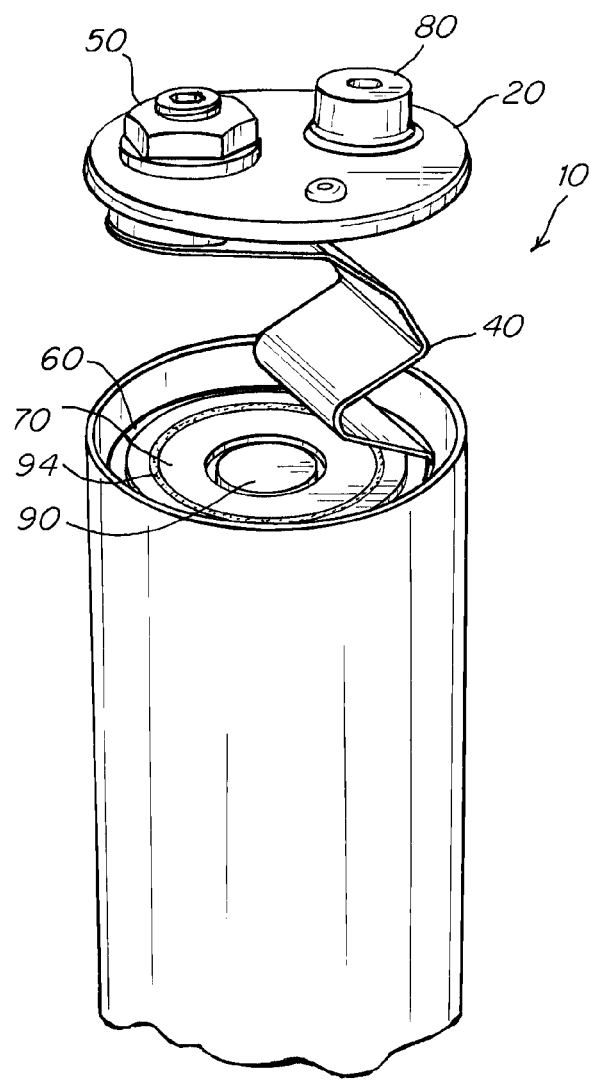
Fig. 1
PRIOR ART
Fig. 2
PRIOR ART

METHOD AND DESIGN FOR EXTERNALLY APPLIED LASER WELDING OF INTERNAL CONNECTIONS IN A HIGH POWER ELECTROCHEMICAL CELL

This application claims benefit of U.S. Provisional Application Ser. No. 61/117,760 filed on Nov. 25, 2008, entitled "Method and Design for Externally Applied Laser Welding of Internal Connections in a High Power Electrochemical Cell," which is incorporated herein by reference.

This invention was made with government support under Contract No. DE-FC26-05NT42403 awarded by the Department of Energy. The Government has certain rights in this invention.

FIELD OF THE INVENTION

Embodiments consistent with the present invention relate to electrochemical cells, and particularly, a high strength, low impedance electrical contact between internal components provided by a laser weld.

BACKGROUND OF INVENTION

In an electrochemical cell, e.g., a battery cell, electric current is carried from a battery electrode foil to a centrally located terminal. The electrode foil can be directly connected to the central terminal, or it can be connected to the central terminal through a current collecting tab. In some conventional energy delivery devices, the orientation of the plane of the foil or tab at the location in which it connects to the central terminal largely coincides with the longitudinal axis of the cell. Employing such a connection requires considerable vertical space in the cell.

Known means of joining electrode tabs using ultrasonic, resistance or other welding methods require that the interior battery cell components, e.g. tabs, be accessible to weld anvils, electrodes, laser beams, etc. Examples of prior joining techniques are disclosed in U.S. patent application Ser. No. 12/135,708, entitled Cap Assembly For a High Current Capacity Energy Delivery Device, which is hereby incorporated by reference.

A commercially available prior art design of a lithium ion battery cell 10 is shown in FIG. 1. The battery cell 10 comprises terminal end 20 and non-terminal end 30. The battery cell 10 is shown with the terminal end 20 removed in FIG. 2. Extension tab 40 is provided to electrically couple the terminal cap 20 to internal workings of the battery cell 10. More specifically, the extension tab 40 serves as a conduit between the negative terminal 50 and the negative current collecting electrode tabs 60, which are positioned beneath washer 70. Although the extension tab is necessary in this configuration, it takes away from the volume of the cell which could otherwise be used to provide a higher capacity battery. The positive terminal 80 is electrically coupled to the cell 10 which maintains a positive potential. A radial weld is made to couple the electrode tabs 60 to core insert 90 and produces weld mark 94.

SUMMARY OF EXEMPLARY EMBODIMENTS OF THE INVENTION

Exemplary embodiments of the invention provide an end-cap insert for use in an electrochemical cell that is specifically designed to permit penetration of laser energy through to at least one electrode tab. The cap insert design also performs the function of constraining the circular weld path to ensure that the underlying electrode tabs are completely overlapped without spaces between them. Without the presence of internal gaps, all spatter formed by the laser generated keyhole is directed out of the cell thereby reducing risks associated with free metallic particles when welding internal components of the cell.

According to an exemplary aspect, an electrochemical cell is provided having a canister; a core insert disposed in the canister; and an end cap insert having an external surface facing away from the core insert. At least one electrode tab is disposed between the end cap insert and the core insert. The end cap insert, the at least one electrode tab, and the core insert are electrically coupled by a weld provided by an external laser beam. The weld provides a physical transformation of the welded components that extends from the external surface of the end cap insert to the core insert.

According to another aspect of the invention, a method of externally connecting internal components of an electrochemical cell is provided. The method comprises providing a cell canister; disposing at least one electrode tab in the canister; inserting a core insert into the canister; placing an end cap insert opposite the core insert; and applying an external laser beam to the end cap insert, wherein the end cap insert, the at least one electrode tab, and the core insert are electrically coupled by a weld which extends from the end cap insert to the core insert.

In any of the preceding embodiments, the end cap insert is one of a cathode and anode potential of the cell. The weld extends in a longitudinal direction of the electrochemical cell and begins at a hollow area of the end cap insert. The weld penetrates the end cap insert and the at least one electrode tab.

In any of the preceding embodiments, the weld is completely contained within the end cap insert, the at least one electrode tab and the core insert.

In any of the preceding embodiments, the weld does not pass through any internal gaps between the end cap insert, the at least one electrode tab and the core insert.

In any of the preceding embodiments, an end cap surrounds the end cap insert and is attached to the canister by a seam weld.

In any of the preceding embodiments, the end cap is provided at a different potential than the canister. The end cap insert may be at a positive potential and comprise aluminum. The end cap insert may be at a negative potential and made of a material selected from the group consisting of iron, steel, nickel plated steel, nickel, stainless steel, copper and copper alloys.

In any of the preceding embodiments, a rivet is disposed around the end cap insert. The end cap insert may form part of a negative terminal and the rivet may comprise nickel plated steel. In a further embodiment, the rivet and core insert are provided in the form of a single unitary piece or component.

In any of the preceding embodiments, the weld is a keyhole weld. The weld may form a circular path that is approximately one-half that of the at least one electrode tab width so the resultant weld is entirely constrained within a solid stack of material comprising the end cap insert, the at least one electrode tab and the core insert.

In any of the preceding embodiments, the end cap insert is in the shape of a cup and the external laser beam follows a circular path in a hollow portion of the end cap insert.

In any of the preceding embodiments, the end cap insert is coated with a non-porous, adhesive polymer coating.

Exemplary embodiments of the invention provide a cup design that occupies less space than prior technologies, so as to be more volumetrically and gravimetrically efficient. Accordingly, a greater amount of active mass can be built into the electrochemical cell. It will be appreciated that the above-described features may be implemented in combination with each other.

BRIEF DESCRIPTION OF THE DRAWINGS

Exemplary embodiments of the present invention will be understood and appreciated more fully from the following detailed description, taken in conjunction with the drawings in which:

FIG. 1 is a traditional electrochemical cell design;

FIG. 2 is a traditional electrochemical cell with its terminal end removed;

DETAILED DESCRIPTION OF EXEMPLARY EMBODIMENTS OF THE INVENTION

Embodiments consistent with the present invention utilize external laser energy to couple a cap component to internal components of battery cell. Keyhole welding may be used in which a high-power, laser beam creates a vapor cavity in the part to be welded, which is then filled in with liquid metal. Other welding means may be employed other than laser welding to effect the external weld. Viable welding methods may include electron beam welding, plasma arc welding, or resistance welding. Soldering or brazing techniques could also be employed to join the parts.

Figure 3A:
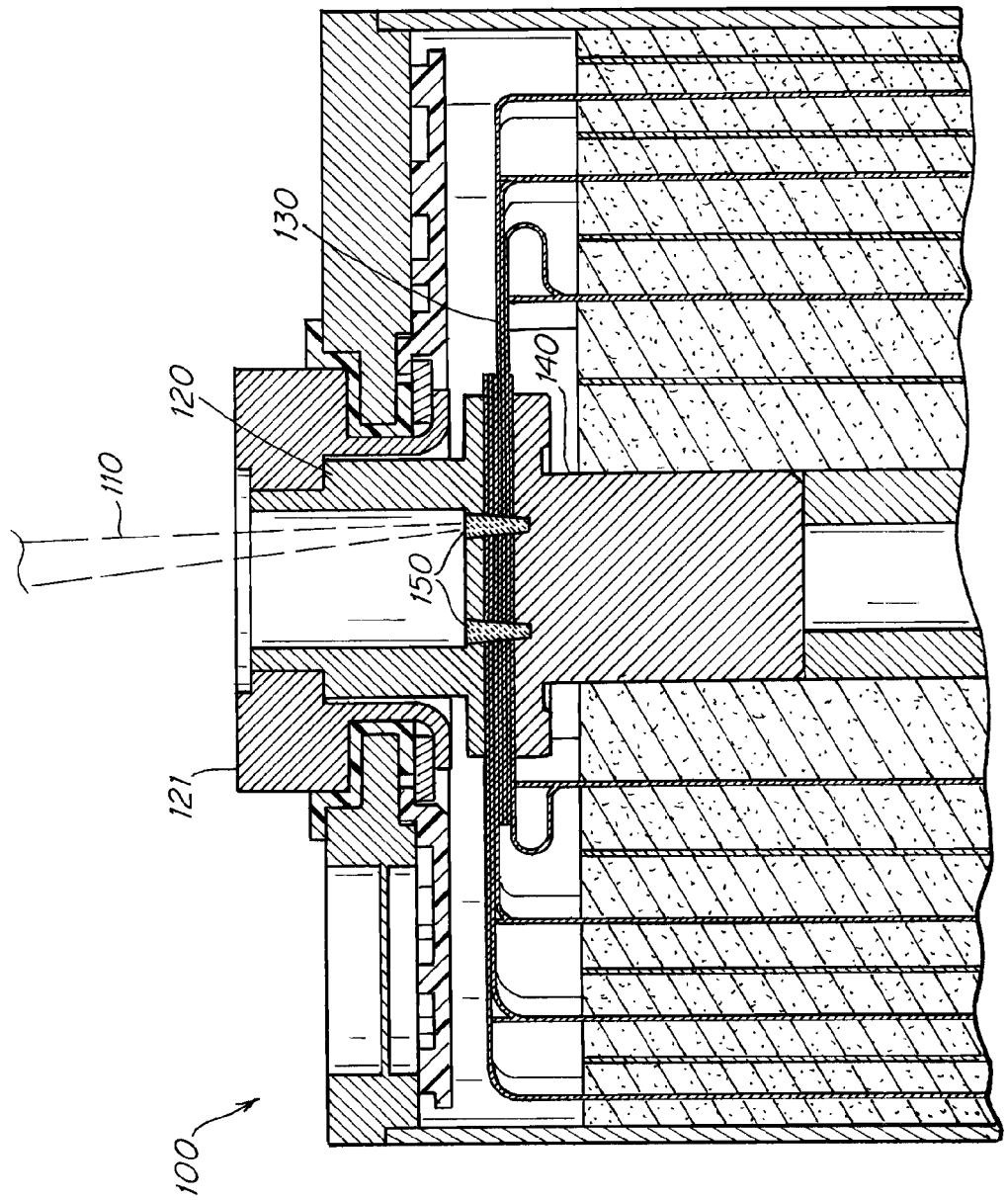
FIG. 3A is a cross-sectional view of a battery cell design utilizing an external laser welding of electrode tabs.

FIG. 3A is a cross-sectional view of a battery cell illustrating welded components comprising an end cap insert 120, electrode tabs 130 and jellyroll core insert 140 in an exemplary high power lithium ion battery cell 100, according to an embodiment of the present invention. These components are communicatively joined with each other via assembly of the end cap onto the can containing the round jellyroll core insert 140, such that the end cap insert 120, the electrode tabs 130 and a jellyroll core insert 140 are disposed in their assembled positions before applying the weld. In an exemplary embodiment, the jellyroll has a cylindrical shape.

Externally generated laser energy 110 is directed at the surface of the cap insert 120, which subsequently penetrates and welds the end cap insert 120 to the underlying tabs 130 and supporting core insert 140 by forming laser joining posts or weld nuggets 150. In an embodiment, an approximately 4 mm, for example, weld diameter helps assure that the weld completely penetrates all tab layers of 8 mm, for example, wide electrode tabs 130, thereby greatly reducing, or entirely eliminating the risk of spatter internal to the cell. Accordingly, the risk of laser energy 110 penetrating any portions of the core insert 140 and damaging the jelly roll is minimized. The diameter of the laser path should be sized such that it does not encompass gaps or spaces between the electrodes. The surface of the cap insert 120 has a thickness that permits efficient penetration of the laser. In an exemplary embodiment, the portion of the cap insert 120 subjected to the laser has a thickness of approximately 0.5 mm.

A reduced diameter core insert 140 could also be used and potentially eliminate the need for reverse bending of two innermost tabs 130. The end cap insert 120 is securely affixed to the battery cell 100 via rivet 121, which is designed to minimize the amount of material the externally applied laser 110 must penetrate in order to effectively combine all the electrode tabs 130 together, and to reduce excessive heating of surrounding components, which could otherwise negatively impact operation of the battery cell. The cup-like design of the cap insert 120 restricts a keyhole welding path and keeps spatter to the cell exterior to provide advantages over internal welding of interior components, by eliminating the possibility of generating small, free floating metallic particles and molten materials inside of the electrochemical cell.

Certain materials are electrochemically compatible at the positive electrode potential of a Li-ion battery cell and certain materials are electrochemically compatible at the negative electrode potential of a Li-ion battery cell. In some embodiments, materials that are compatible at one potential may not be compatible at the opposing potential of the battery cell. Exemplary materials for the positive potential portions of the cell are aluminum and aluminum alloys. These materials present an additional advantage of having the ability to be welded by generally available laser technology.

Examples of materials incorporated for components at the negative potential of a Li-ion cell comprise iron, steel, nickel plated steel, nickel, stainless steel and copper or alloys of copper, e.g. brasses and bronzes. In an embodiment of the present invention, the end cap insert 120 is comprised of high purity nickel (Ni 200 or Ni 201), which may be readily welded to copper, which is an exemplary material of construction for tabs 130. Copper is often utilized as the negative electrode tab material in a lithium ion cell. Copper has considerably lower electrical resistivity than nickel. Copper also facilitates achieving greater volumetric and gravimetric power density than nickel. A disadvantage of copper is that when joined to steel by means of fusion welding, cracks tend to form in the weld, making the hermetic nature of such welds unreliable. However, nickel can be readily welded to copper by laser welding and is an exemplary material for construction of the cap insert design. Nickel can also be readily joined to nickel plated steel, which is an exemplary material for the rivet component of the negative terminal of the cell. When the end cap insert is made of a material susceptible to atmospheric corrosion, such as when steel or nickel plated steel is employed as the end cap insert material, a non-porous adhesive polymer coating, such as epoxy or acrylic may be used to protect from corrosive environments.

Figure 3B:
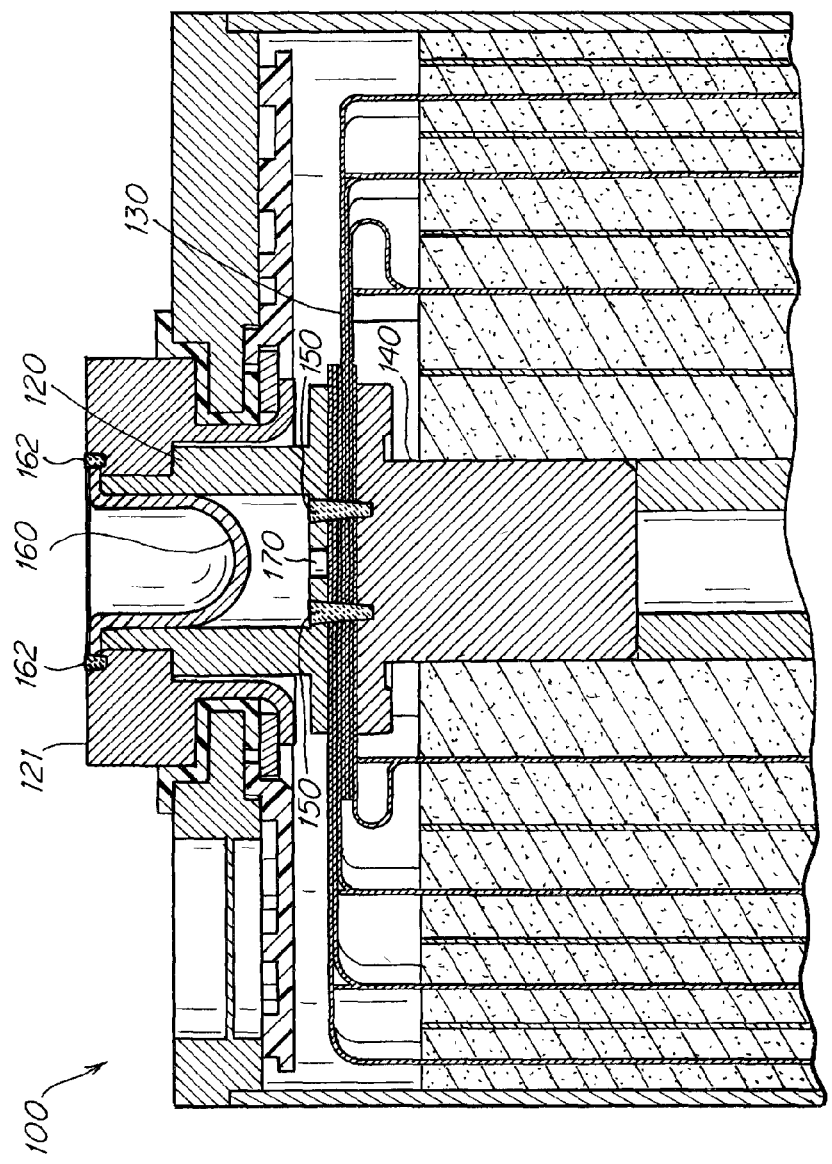
FIG. 3B is a cross-sectional view of a battery cell design utilizing a sealing cap.

FIG. 3B is a cross-sectional view of an alternative battery cell illustrating the welded components of FIG. 3A, including the end cap insert 120, electrode tabs 130 and jellyroll core insert 140 coupled by the weld nugget 150 to provide a high power lithium ion battery cell 100. In accordance with an exemplary embodiment, the end cap insert 120 houses a sealing cup 160 positioned above a vent hole 170 of the end cap insert 120. The vent hole 170 extends through the bottom of the end cap insert 120. The sealing cup 160 may be coupled to the end cap insert 120 by providing a weld 162, for example, around the cup's 160 upper rim.

Typically the circular weld provided by the nugget or other type of weld 150 creates a hermetic seal between an internal area of the cell 100 and external areas. The weld 150 also provides structurally stability to the coupled components and furthers electrical connectively between the components. In certain circumstances, the weld nugget 150 may compromise a hermetic seal if cracks or imperfections develop. An exemplary aspect of this embodiment provides the vent 170 to counter any seal attributed to the weld 150. Also, the weld 150 may be formed for less than a 360 degree circle by extending the weld for only approximately 350 degrees or so, by way of example. Extending the weld for 350 degrees or less than 360 degrees may still provide the needed structural integrity and electrically conductivity between the coupled components, while not ensuring a complete hermetic seal. Instead, the end cap insert 120 is hermetically sealed by the sealing cup 160. After the sealing cup 160 is inserted, a leak test can be conducted. The leak test may be performed in any suitable manner, including pressurization by injecting nitrogen or helium into the cell and monitoring escaping gas, as would be appreciated by one of skill in the art.

By not relying on the weld 150 to provide the hermetic seal, testing can determine whether the sealing cup 160 alone is sufficient to provide the hermetic seal. This eliminates false reliance on the existence of a lasting hermetic seal in situations where the leak test determines that no leak exists, and in which the seal is being temporarily provided by the weld 150 instead of the cup 160. If the cup 160 were to be faulty from the start while the cell still passes the leak test, a situation may exist where the weld 150 then later deteriorates or otherwise develops an imperfection that eliminates or reduces the hermetic seal. This scenario raises concern due to the weld 150 being more apt to develop an imperfection later in time than the sealing cup 160. If it is known from the start that the hermetic seal is properly provided by the sealing cup 160 instead of the weld 150, there may be increased confidence in the cell's ability to maintain the hermetic seal over time.

Figure 4:
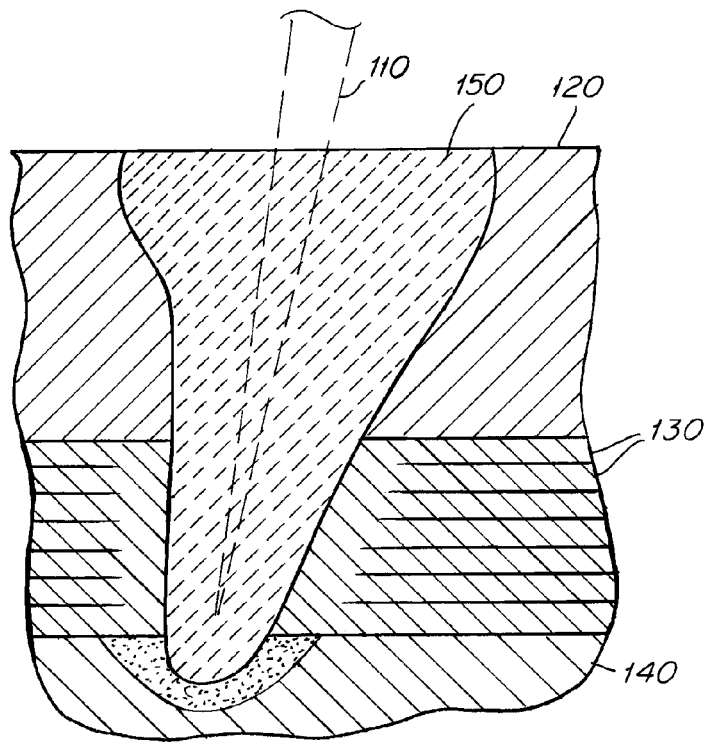
FIG. 4 is a cross-sectional view of an external laser beam weld nugget that provides a weld through a tab stack and into a core insert.

Referring to FIG. 4, a cross sectional view of an externally applied laser weld nugget is shown. External laser beam energy 110 is directed through end cap insert 120 so that electrode tabs 130 are welded to jellyroll core insert 140. The welded material extends from the inner surface of the end cap insert 120 to the jellyroll core insert 140 in a circular manner. This embodiment of the weld nugget displays a classic shape of keyhole laser welding. Other forms of welding, such as conduction welding, may be used. Conduction welding is less invasive to the material, but may allow greater heat propagation to surrounding elements. Keyhole welding is more focused than conduction welding and typically uses a higher peak power for short bursts of time. The welding is carried out in a circular motion along an inner portion of the end cap insert 120.

Figure 5A:
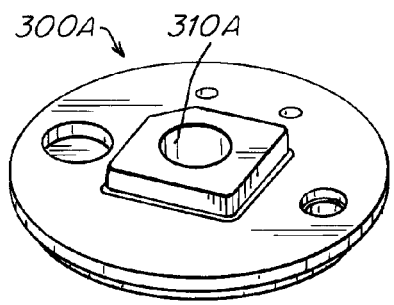
FIG. 5A: is a schematic view of a cathode cap with an insert in accordance with an aspect of the invention.
Figure 5B:
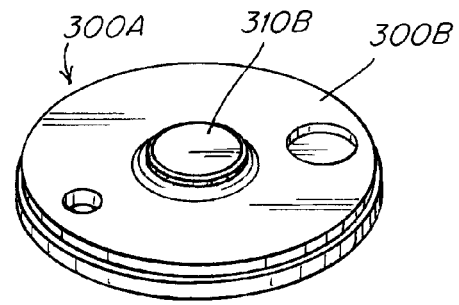
FIG. 5B is a schematic view of an anode cap in accordance with an aspect of the invention.
Figure 5C:
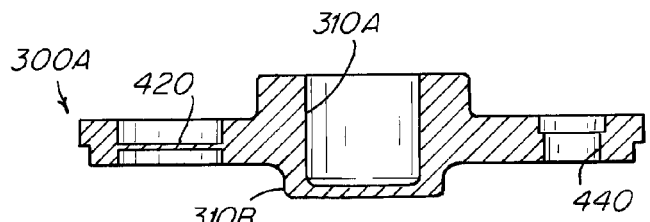
FIG. 5C is a cross sectional view of a cathode cap with an insert in accordance with an aspect of the invention.

FIG. 5A illustrates an alternative embodiment comprising a terminal end cathode cap 300A with an integrally constructed end cap insert 310A. In this exemplary embodiment, one or both terminals of the cell may be electrically isolated from the cell can (not shown). FIG. 5B shows the bottom 300B of the cap 300A and includes a protrusion 310B that presses against the electrodes when assembled. FIG. 5C is a cross sectional view illustrating the end cap insert 310A, vent 420 and fill hole 440. The embodiments of FIGS. 5A-5C allow for the externally applied laser weld to extend from the outwardly facing bottom surface of the end cap insert 310A, through the protrusion 310B and to the jelly roll core insert 140, as described above.

Figure 6:
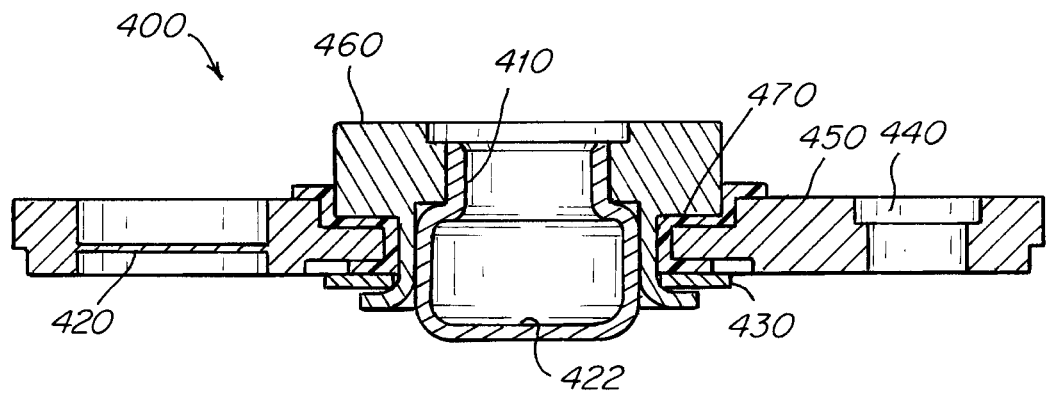
FIG. 6 is a cross-sectional view of a non-integrated cathode end cap/insert design in accordance with an aspect of the invention.

Referring to FIG. 6, a cap assembly 400 is shown with an alternative end cap insert 410. External laser energy is directed to the inner, outwardly facing surface 422 of end cap insert 410 to couple underlying electrode tabs to the core insert, in the manner described above. Vent 420 is provided in the end cap insert 410 to release pressure build up in the battery cell. Rivet 460 is disposed around the end cap insert 410 and coupled to the end cap insert 410 to provide electric contact to external devices. The rivet 460 can be made of an electrically and thermally conductive material that is compatible with the electrochemistry of the cell.

Washer 430 is provided to securely fit the end cap insert 410 with the adjacent components. Polymer gasket 470 is provided as a seal between the cap and the tabs of the cells. Other materials could be used to form the seal, such as a glass based interface. The gasket 470 provides a liquid-tight seal and electric isolation between the cap plate 450 and the rivet 460. Fill hole 440 is provided to add electrolytic solution to the cell. The cap plate 450 surrounds the rivet 460, such that the cap assembly 400 merges with the cell can. The end cap insert 410 may serve as part of the cathode or anode connection.

Figure 7:
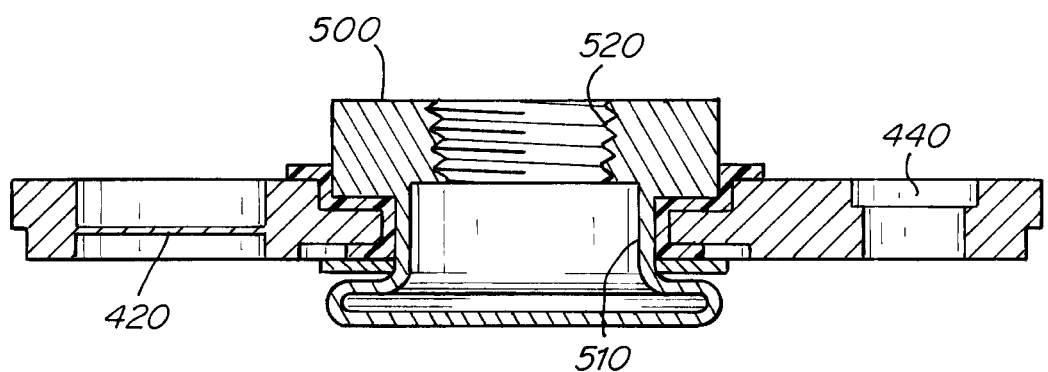
FIG. 7 is a cross-sectional view of an integrated cathode end cap/insert design in accordance with an aspect of the invention.

Referring to FIG. 7, an exemplary non-limiting embodiment of an integrated cathode cap cup design is illustrated. The design is similar to that of the non-integrated embodiment depicted in FIG. 6; however, the rivet 500 and end cap insert 510 are molded into a single unitary component. As shown, threads 520 may be provided for coupling the electrochemical cell to a device requiring energy or another cell.

Figure 8:
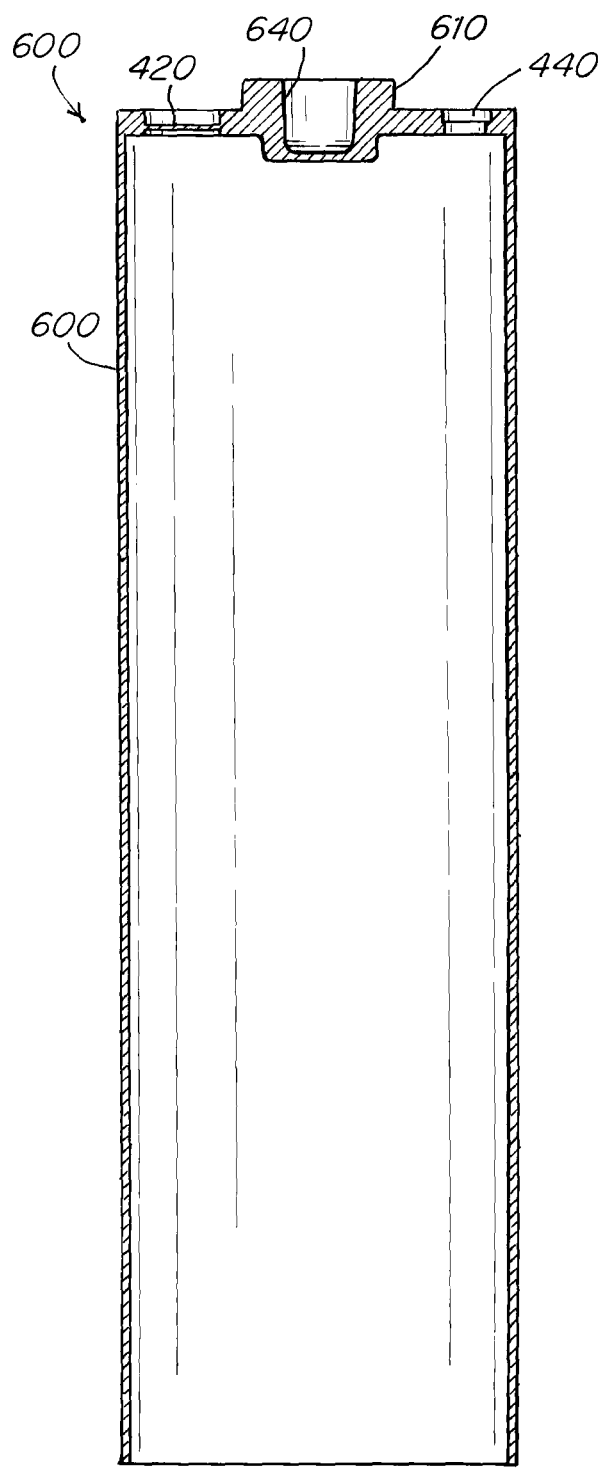
FIG. 8 is a cross-sectional view of a canister integrally formed with an end cap in accordance with an aspect of the invention.

Referring to FIG. 8, a further embodiment is shown, including an integral cathode cap/can design, with the end cap insert 610 as part of the cell can 600. In addition to removing the possibility of weld particles entering the cell, an advantage of this embodiment is that there are fewer parts required to construct the cell. As shown in FIG. 8, this embodiment allows for one terminal of the cell to be isolated from the cell canister 600. The isolated or non-integral terminal may be appropriate for the negative terminal due to cost and properties of materials used for the negative terminal. For example, if aluminum is used for the integral terminal, the cell canister 600 will have a lighter material for a majority of its construction. The likelihood of corrosion of materials is less at the negative potential of the cell. In this embodiment, the internal components of the cell are placed into the cell canister 600 via the open end of the cell. The end cap insert 640 allows external laser energy to affix electrode tabs to the core insert by being directed through the opening 640 in a circular manner, as shown for example in FIG. 3. Vent 420 and fill hole 440 are also included and operate in a similar fashion as in the non-integrated cap/can assemblies.

The above-described features may be implemented in combination with each other to provide various exemplary embodiments in accordance with the invention.

While the foregoing describes various embodiments of the present invention, those of ordinary skill in the relevant arts will recognize the many variations, alterations, modifications, substitutions and the like as are readily possible, especially in light of this description, the accompanying drawings and claims drawn thereto. In any case, because the scope of the present invention may be much broader than a particular embodiment, the foregoing detailed description should not be construed as a limitation of the scope of the present invention, which is limited only by the claims appended hereto.

What is claimed is:

1. An electrochemical cell comprising:
 a canister;
 a core insert disposed in the canister;

an end cap insert, the end cap insert having an external surface facing away from the core insert; and a plurality of electrode tabs disposed between the end cap insert and the core insert, wherein the end cap insert, the plurality of electrode tabs, and the core insert are electrically coupled by a unitary weld provided by a welding source external to the canister, the unitary weld including a physical transformation of the end cap insert, the plurality of electrode tabs, and the core insert, the physical transformation extending from the external surface of the end cap insert to the core insert, and wherein the unitary weld is formed after the electrochemical cell is assembled by welding the end cap insert, the plurality of electrode tabs, and the core insert in the assembled cell through the external surface of the end cap insert.

2. The electrochemical cell according to claim 1, wherein the welding source is a laser beam and the physical transformation comprises molten material that has solidified.

3. The electrochemical cell according to claim 1, wherein the weld extends in a longitudinal direction of the electrochemical cell and begins at a hollow area of the end cap insert.

4. The electrochemical cell according to claim 1, wherein the weld penetrates an entire thickness of a recessed portion of the end cap insert and the plurality of electrode tabs in a longitudinal direction of the cell.

5. The electrochemical cell according to claim 1, wherein the weld is completely contained within the end cap insert, the plurality of electrode tabs and the core insert.

6. The electrochemical cell according to claim 1, wherein the weld does not pass through any internal gaps between the end cap insert, the plurality of electrode tabs and the core insert.

7. The electrochemical cell according to claim 1, wherein an end cap surrounds the end cap insert and is attached to the canister by a seam weld.

8. The electrochemical cell according to claim 7, wherein the end cap is provided at a different potential than the canister.

9. The electrochemical cell according to claim 1, wherein the end cap insert is at a positive potential and comprises aluminum.

10. The electrochemical cell according to claim 1, wherein the end cap insert is at a negative potential and made of a material selected from the group consisting of iron, steel, nickel plated steel, nickel, stainless steel, copper and copper alloys.

11. The electrochemical cell according to claim 1, wherein a rivet is disposed around the end cap insert.

12. The electrochemical cell according to claim 11, wherein the end cap insert forms part of a negative terminal and the rivet comprises nickel plated steel.

13. The electrochemical cell according to claim 1, wherein the rivet and core insert are provided in the form of a single unitary piece.

14. The electrochemical cell according to claim 1, wherein the weld is a keyhole weld.

15. The electrochemical cell according to claim 1, wherein the weld follows a circular path that is approximately one-half the width of the plurality of electrode tabs, wherein the resultant weld is entirely constrained within a solid stack of material comprising the end cap insert, the plurality of electrode tabs and the core insert.

16. The electrochemical cell according to claim 1, wherein the end cap insert is in the shape of a cup.

17. The electrochemical cell according to claim 2, wherein the external laser beam follows a circular path and the end cap insert has a hollow portion that constrains the circular path.

18. The electrochemical cell according to claim 1, wherein the end cap insert is coated with a non-porous adhesive polymer coating.

19. The electrochemical cell according to claim 1, comprising a sealing cup attached to the end cap insert to provide a hermetic seal between the end cap insert and an internal area of the electro chemical cell.

20. The electrochemical cell according to claim 19, wherein the end cap insert comprises a vent hole extended through the external face.

* * * * *